United States Patent [19]

Scott

[11] 4,313,848

[45] Feb. 2, 1982

[54] METHOD FOR REMOVING COKE FROM PARTICULATE CATALYST

[75] Inventor: John W. Scott, Ross, Calif.

[73] Assignee: Chevron Research Company, San Francisco, Calif.

[21] Appl. No.: 163,538

[22] Filed: Jun. 27, 1980

[51] Int. Cl.³ .................. B01J 29/38; B01J 21/20; C10G 11/05; C10G 11/04

[52] U.S. Cl. ................... 252/418; 110/345; 208/113; 208/147; 208/164; 208/174; 252/411 S; 252/417; 422/142; 422/144; 422/216; 422/234; 423/239

[58] Field of Search ............ 252/417, 418, 419, 411 S; 208/148, 164, 147; 422/142, 144; 423/239; 110/345, 347

[56] References Cited

U.S. PATENT DOCUMENTS

| | | | |
|---|---|---|---|
| 2,613,173 | 10/1952 | Kaasa | 252/417 |
| 3,902,990 | 9/1975 | Luckenbach | 208/164 |
| 3,909,392 | 9/1975 | Horecky, Jr. et al. | 208/120 |
| 3,926,843 | 12/1975 | Owen | 252/417 |
| 4,064,039 | 12/1977 | Penick | 252/417 |
| 4,115,250 | 9/1978 | Flanders et al. | 208/120 |
| 4,180,454 | 12/1979 | Luckenbach | 252/417 |
| 4,199,435 | 4/1980 | Chessmore et al. | 208/113 |

Primary Examiner—P. E. Konopka
Attorney, Agent, or Firm—D. A. Newell; S. R. LaPaglia; W. D. Reese

[57] ABSTRACT

Coke is removed from particulate catalyst by passing coke-containing catalyst downwardly through a regenerator without backmixing, in a countercurrent flow with respect to a regeneration gas having a limited free-oxygen content, so that nitrogen oxides are reacted to form free nitrogen in a substantially oxygen-free atmosphere in an intermediate level of the regenerator, and carbon monoxide formed in the intermediate level is burned in contact with coke-free catalyst with additional oxygen introduced into an upper level of the regenerator.

7 Claims, 1 Drawing Figure

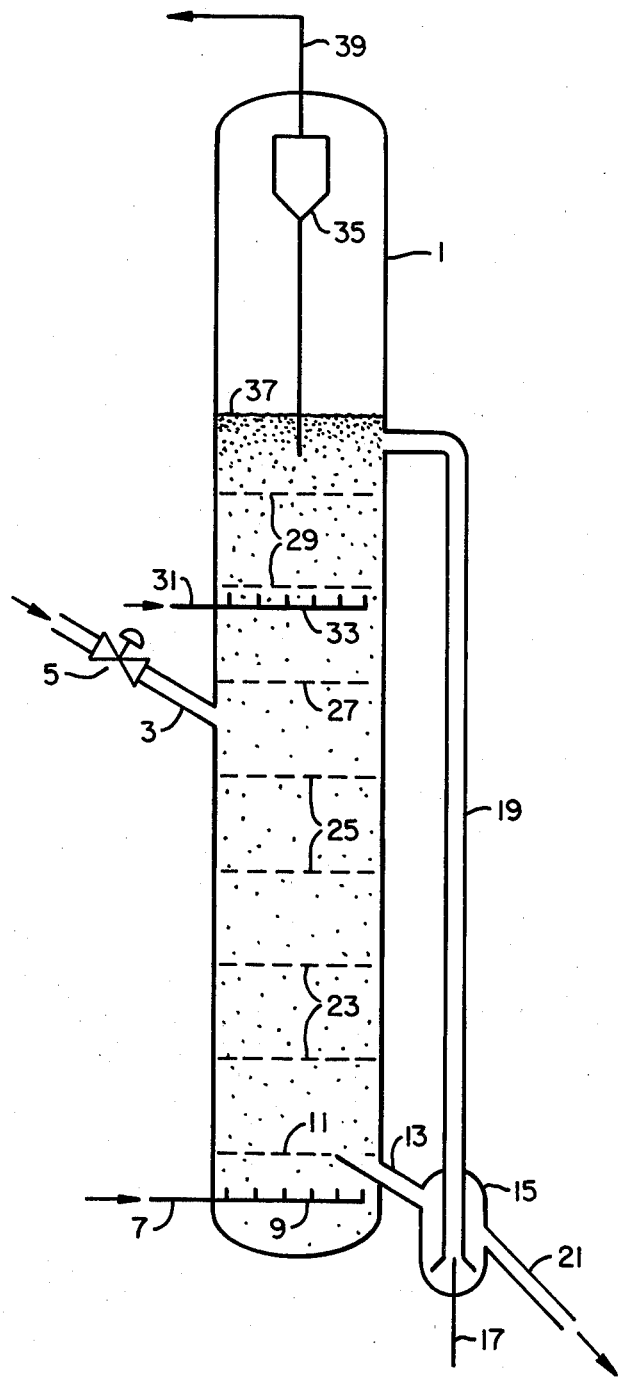

METHOD FOR REMOVING COKE FROM PARTICULATE CATALYST

BACKGROUND OF THE INVENTION

This invention concerns the art of catalyst regeneration. More specifically, the present invention concerns a method for burning nitrogen-containing coke off coke-containing particulate catalyst while avoiding contamination of flue gas formed in burning the coke.

Catalytic cracking systems employ catalyst in a moving bed or a fluidized bed. Catalytic cracking is carried out in the absence of externally supplied molecular hydrogen, in contrast to hydrocracking, in which molecular hydrogen is added during the cracking step. In catalytic cracking, an inventory of particulate catalyst is continuously cycled between a cracking reactor and a catalyst regenerator. In a fluidized catalytic cracking (FCC) system, hydrocarbon feed is contacted with catalyst particles in a hydrocarbon cracking zone, or reactor, at a temperature of about 425° C.–600° C., usually 460° C.–560° C. The reactions of hydrocarbons at the elevated operating temperature result in deposition of carbonaceous coke on the catalyst particles. The resulting fluid products are separated from the coke-deactivated, spent catalyst and are withdrawn from the reactor. The coked catalyst particles are stripped of volatiles, usually by means of steam, and passed to the catalyst regeneration zone. In the catalyst regenerator, the spent catalyst is contacted with a predetermined amount of molecular oxygen. A desired portion of the coke is burned off the catalyst, restoring catalyst activity and simultaneously heating the catalyst to, e.g., 540° C.–815° C., usually 590° C.–730° C. Flue gas formed by combustion of coke in the catalyst regenerator may be treated for removal of particulates and for conversion of carbon monoxide, after which the flue gas is normally discharged into the atmosphere.

Most FCC units now use zeolite-containing catalyst having high activity and selectivity. Zeolite-type catalyst have a particularly high activity and selectivity when the concentration of coke on the catalyst after regeneration is relatively low, so that it is generally desirable to regenerate zeolite-containing catalysts to as low a residual carbon level as is possible. It is also normally desirable to burn carbon monoxide as completely as possible within the catalyst regeneration system to conserve heat. Heat conservation is especially important when the concentration of coke on the spent catalyst is relatively low as a result of high catalyst selectivity. Among the ways suggested to decrease the amount of carbon on regenerated catalyst and to burn carbon monoxide in a manner which provides process heat, is carrying out carbon monoxide combustion in a dense-phase catalyst bed in the catalyst regenerator using an active, combustion-promoting metal. Metals have been used either as an integral component of the cracking catalyst particles or as a component of a discrete particulate additive, in which the active metal is associated with a support other than the catalyst particles.

Various ways of employing carbon monoxide combustion-promoting metals in cracking systems have been suggested. In U.S. Pat. No. 2,647,860, it is proposed to add 0.1–1 weight percent chromic oxide to a cracking catalyst to promote combustion of carbon monoxide to carbon dioxide and to prevent afterburning. In U.S. Pat. No. 3,808,121, it is proposed to introduce relatively large-sized particles containing a carbon monoxide combustion-promoting metal into a cracking catalyst regenerator. The circulating particulate solids inventory, comprised of relatively small-sized catalyst particles, is cycled between the cracking reactor and the catalyst regenerator, while the combustion-promoting particles remain in the regenerator because of their size. Oxidation-promoting metals such as cobalt, copper, nickel, manganese, copper-chromite, etc., impregnated on an inorganic oxide such as alumina, are disclosed. Belgian Patent Publication No. 820,181 suggests using catalyst particles in platinum, palladium, iridium, rhodium, osmium, ruthenium or rhenium to promote carbon monoxide oxidation in a catalyst regenerator. An amount of the metal between a trace and 100 parts per million is to be added to the catalyst particle, either during catalyst manufacture or during the cracking operation, as by addition of a compound of the combustion-promoting metal to the hydrocarbon feed. Addition of the promoting metal to the cracking system is said by the publication to decrease product selectivity in the cracking step by substantially increasing coke and hydrogen formation. Catalyst particles containing the promoter metal can be used alone or can be circulated in physical mixture with catalyst particles free of the combustion-promoting metal. U.S. Pat. No. 4,072,600 and No. 4,093,535 disclose the use of combustion-promoting metals in cracking catalysts in concentrations of 0.01 to 50 ppm, based on total catalyst inventory.

One problem encountered in some cracking operations using metal-promoted, complete carbon monoxide combustion-type regeneration has been the generation of undesirable nitrogen oxides ($NO_x$) in the flue gas formed by burning coke. The present invention is directed, in part, toward providing a catalyst regeneration system, which accomplishes complete coke removal and complete carbon monoxide combustion within a catalyst regeneration system, while substantially decreasing the concentration of nitrogen oxide present in flue gas formed by burning coke.

Representative of catalyst regeneration patent literature previously published are the following patents: U.S. Pat. No. 3,909,392 describes a scheme for enhancing carbon monoxide combustion by thermal means. Catalyst is used a heat sink for the increased heat production. British Patent Publication No. 2,001,545 describes a two-stage system for a regenerating catalyst, with partial catalyst regeneration being carried out in the first stage and further more complete regeneration being carried out in the second stage with a separate regeneration gas. U.S. Pat. No. 3,767,566 describes a two-stage regeneration scheme in which partial regeneration takes place in an entrained catalyst bed, and secondary, more complete regeneration takes place in a dense fluidized catalyst bed. A somewhat similar regeneration operation is described in U.S. Pat. No. 3,902,990, which discusses the use of several stages of regeneration, with dilute- and dense-phase beds of catalysts being employed, and with the use of plural streams of regeneration gas. U.S. Pat. No. 3,926,843 describes a plural-stage regeneration scheme in which dilute-phase and dense-phase coke burning are performed. British Patent Publication No. 1,499,682 discloses use of a combustion-promoting metal for enhancing carbon monoxide combustion. None of the above cited patents provides a method for forming a flue gas having low concentrations of both carbon monoxide and nitrogen oxides, while accomplishing essentially complete removal of coke from the catalyst.

SUMMARY OF THE INVENTION

I have found that nitrogen-containing coke can be burned off a coke-containing a particulate catalyst and a flue gas free from both carbon monoxide and $NO_x$ can be formed in burning the coke, by passing deactivated catalyst downwardly, without substantial backmixing, through a regenerator in countercurrent flow to an upwardly flowing, oxygen-containing regeneration gas. Nitrogen oxides formed in a lower, complete combustion section of the regenerator are reacted in a substantially oxygen-free atmosphere in an intermediate section of the regenerator to form elemental nitrogen, and carbon monoxide formed in the regeneration gas in the intermediate section is burned in an upper section of the regenerator in the presence of coke-free catalyst, using additional free oxygen.

DESCRIPTION OF THE DRAWING

The attached drawing is a schematic representation of one preferred embodiment of the present invention.

Referring to the drawing, there is shown a regeneration vessel 1. Spent, coke-containing catalyst is introduced into an intermediate level of the vessel through a conduit 3 at a rate adjustable by means of a valve 5. A regeneration gas stream containing free oxygen is introduced into the vessel through a conduit 7 and a distributor 9. Spent catalyst entering the vessel flows generally downwardly, countercurrently to the regeneration gas, which is conducted upwardly through the vessel. Catalyst is retained above a gas distribution grid 11 at the lower end of the vessel. Substantially coke-free catalyst is removed from the regeneration vessel above the grid 11 through a conduit 13 and passed into the surge vessel 15. A minor portion of the coke-free catalyst in the vessel 15 is entrained in a stream of a gas such as steam, introduced through a conduit 17. Coke-free catalyst is passed upwardly in the entraining gas into an upper section of the vessel 1 through a conduit 19. Most of the coke-free catalyst is removed from the regeneration system, and returned to catalytic service or other desired use, by way of a conduit 21. Essentially plug-type downward flow of the catalyst undergoing regeneration is enhanced in the vessel 1, and gross backmixing of the downwardly moving catalyst is substantially restricted, by including in the regeneration vessel internals such as the perforated plates 23, 25, 27 and 29. Regeneration gas in the lower section of the vessel adjacent the grid 11 and the plates 23 has a high free-oxygen concentration. The high temperatures generated in this portion of the vessel by burning coke and carbon monoxide, preferably in the presence of a metallic combustion promoter, in the highly oxidizing atmosphere result in the formation of nitrogen oxides in the regeneration gas. At higher levels in the vessel 1, in an intermediate section of the bed of catalyst, generally adjacent the plates 25, essentially all the free oxygen in the regeneration gas has been consumed in burning coke and carbon monoxide. The regeneration gas in the intermediate section provides a substantially oxygen-free atmosphere, typically including substantial concentrations of carbon monoxide and carbon dioxide and substantially no free oxygen. The spent catalyst and partly regenerated catalyst in contact with the regeneration gas in this intermediate section contain substantial carbon concentrations. Nitrogen oxides in the regeneration gas react in the oxygen-free atmosphere to form free nitrogen (molecular nitrogen). In an upper section of the vessel generally above the plate 27, additional free oxygen is introduced into the regeneration gas stream, as, for example, through a conduit 31 and a distributor 33. Carbon monoxide present in the regeneration gas is burned with the added free oxygen in contact with substantially coke-free catalyst in the upper section of the regeneration vessel. The coke-free catalyst advantageously supplies a heat sink for heat energy evolved by combustion of carbon monoxide with the additional free oxygen. The resulting carbon monoxide-free and nitrogen oxides-free flue gas is passed into a cyclone separator 35, and any entrained catalyst is separated from the flue gas and returned to the bed of coke-free catalyst. The top of the coke-free catalyst bed is indicated by a line at 37. The pollutants-free flue gas is withdrawn from the top of the vessel through a conduit 39. In order to simplify the explanation, various conventional elements of the regeneration scheme described above are not shown in the attached drawing or described. The operation and disposal of these elements, such as control means, valve and pump means, and the like, will be clear to those skilled in the art.

DETAILED DESCRIPTION OF THE INVENTION

As used herein, the term "oxidizing atmosphere" means an atmosphere containing at least 1.0 volume percent molecular oxygen and less than 0.1 volume percent carbon monoxide.

As used herein, the term "substantially oxygen-free atmosphere" means an atmosphere containing less than 0.5 volume percent free (molecular) oxygen.

As used herein, the term "substantially coke-free catalyst" means catalyst which contain less than 0.2 weight percent carbon.

Catalysts that are best adapted for regeneration by the method of this invention are those in the form of particulate solids. Preferably, catalyst to be regenerated is sized appropriately for catalytic use in an entrained bed or fluidized bed system. With reference to catalytic conversion systems presently in commercial use, the invention is especially advantageous for regeneration of FCC catalysts; however, the invention is not limited to FCC catalyst regeneration, and can be used in burning coke off any coke-containing particulate catalyst.

Regeneration according to the invention can be carried out in any vertically extended vessel or chamber which is capable of containing the regeneration gas and catalyst particles at the temperatures and pressures employed in the operation. A variety of suitable vessels will be apparent to those skilled in the art from the description herein. Preferably, the vessel employed is equipped with a type of internals structure which prevents gases and catalyst particles from by-passing each other, substantially restricts backmixing of catalyst particles in fluidized bed operation, and provides catalyst flow downwardly in the vessel that is essentially plug-type flow in fluidized bed operation. Such internals may be in the form of fixed internals such as perforated plates, baffles, rods, or the like, or can be a packing material. When the catalyst is regenerated in a moving bed operation, as opposed to a fluidized bed, backmixing of catalyst is not found to be a problem, so that internals are not usually useful.

The regeneration gas or gas mixture employed must have an appropriate free-oxygen (molecular oxygen)

content. Normally, air is quite suitable for use in supplying free oxygen but use of air is not essential. For example, pure oxygen of oxyge-enriched air can also be used, if desired. Conventional gases used in commercial FCC operations, such as free nitrogen (molecular nitrogen), carbon dioxide, steam, and the like, are suitable for use as fluidizing and entrainment gases.

In general, regeneration conditions employed in the process include a combination of temperature and pressure sufficient to permit coke combustion, carbon monoxide combustion and nitrogen oxides reaction to take place in the manner discussed below. Temperatures of 540° C.–815° C. are normally quite suitable. Temperatures of 590° C.–730° C. are preferred. The flow of regeneration and entrainment gases and catalyst particles are preferably maintained at rates which provide a fluidized bed of catalyst in the regeneration zone, although a moving bed of catalyst can also be used, if desired. Fluid bed operation can be accomplished in a conventional manner by maintaining a superficial regeneration gas velocity appropriate to the size and density of catalyst particles undergoing regeneration and by maintaining catalyst introduction and withdrawal rates at proper levels. Downward movement of fluidized catalyst in the vessel can be accomplished by simply removing catalyst from the bottom of the bed. The operation pressure is usually not particularly critical. Pressures of 1–20 atmospheres (absolute) are generally quite suitable. Pressures of 1–5 atmospheres are preferred.

The use of a carbon monoxide combustion-promoting metal to aid in burning carbon monoxide in the regeneration gas is preferred in carrying out the invention. Metals and compounds of metals previously suggested for use as carbon monoxide combustion promoters, such as many of the transition metals, can be used. Preferred for use in promoting carbon monoxide combustion in the present system are metals or compounds of metals selected from platinum, palladium, iridium, rhodium, ruthenium, osmium, manganese, copper, and chromium. A combustion-promoting metal is used in a concentration sufficient to enhance the rate of carbon monoxide burning to the degree desired. In commercial FCC operations, the use of platinum in various forms as a carbon monoxide combustion-promoting metal is well known. A combustion-promoting metal may be included as a component of all or a major or minor fraction of the catalyst particles or may be included as a component of discrete, substantially catalytically-inert particles which are mixed with the catalyst inventory in essentially a physical mixture with the catalyst particles. A preferred metal for use in discrete CO-combustion promoter particles is platinum.

Sulfur oxides present in the regeneration gas as a result of burning sulfur-containing coke, may advantageously be removed from the gas by using a solid reactant, or acceptor, as a component of the particulate solids in the regeneration zone. Sulfur oxides in the regeneration gas can be reacted with or adsorbed on the reactant or acceptor to form sulfur-containing solids in the regenerator. In this way, the sulfur oxides content of the flue gas leaving the regenerator may be substantially reduced. A preferred solid reactant for use in this manner is alumina. Alumina reacts with sulfur oxides to form a sulfur-containing solid. The alumina used should have a surface area of at least 50 square meters per gram. Alpha alumina is not suitable. Alumina may be included as a component of the catalyst particles or may be included in discrete particles which are present in the regenerator in physical mixture with the catalyst particles. If discrete alumina-containing particles are mixed with the catalyst, a sufficient amount of alumina is preferably mixed with the catalyst to provide a substantial removal of sulfur oxides from the regeneration gas. Usually, good results can be achieved if 0.1 to 25 weight percent alumina is added. If alumina is present as a component of all or part of the catalyst particles themselves, the catalyst particles are preferably selected to include at least 50 weight percent alumina in the catalyst, on a zeolite-free basis, and particularly preferably, at least 60 weight percent.

It will be apparent to those skilled in the art that the amount of coke contained in spent catalyst, as well as the amount of nitrogen and sulfur impurities in the coke, will vary widely depending on such factors as the composition and boiling range of the hydrocarbon feed being converted using the catalyst, the composition of the catalyst itself, the type of catalytic reaction system in which the catalyst is used (e.g., moving bed, fluid bed, entrained bed), etc. The benefits of burning coke according to the invention can be obtained for catalysts which contain an amount of coke varying in a broad range, and also for coke with a broad range of nitrogen content.

In accordance with the invention, spent catalyst is introduced into an intermediate level of a vertically extending regeneration zone. The vessel or chamber used to provide the regeneration zone must be of sufficient vertical height to allow for maintaining the three sections and to allow for a solids retention time sufficient to accomplish essentially complete combustion of coke in the catalyst reaching the lower end of the regeneration zone. Spent catalyst is introduced into the regeneration vessel far enough from the bottom of the regeneration zone to permit essentially all the coke to be burned off the catalyst particles as the catalyst passes downwardly from the spent catalyst inlet to the lower end of the regeneration zone. Spent catalyst must therefore be introduced into the regeneration vessel sufficiently far from the top of the regeneration zone to provide for a bed of coke-free catalyst in an upper section of the regeneration zone. Preferably, the portion of the bed of the catalyst below the spent catalyst inlet constitutes from 60 to 95% of the total catalyst bed volume in the regenerator, particularly preferably, from 80 to 90% of the total bed volume. The height of the upper section of the regeneration zone containing the bed of regenerated catalyst must be sufficient to permit essentially complete combustion of carbon monoxide in the regeneration gas stream in contact with the coke-free catalyst.

A regeneration gas is introduced into the bottom of the regeneration zone. According to the invention, the amount of free oxygen (molecular oxygen) originally introduced in the regeneration gas is (1) sufficient to react stoichiometrically with substantially all the coke carbon introduced into the regeneration zone in the spent catalyst to form carbon monoxide, and (2) restricted to an amount less than needed to react stoichiometrically with substantially all the coke carbon introduced into the regeneration zone in the spent catalyst to form carbon dioxide. When the amount of free oxygen introduced into the lower end of the regenerator in the regeneration gas is maintained within the proper range, the composition of the regeneration gas changes from a highly oxidizing atmosphere with a high oxygen concentration and low carbon monoxide concentration in contact with essentially coke-free catalyst in the lower section of the regeneration zone to a substantially oxygen-free atmosphere, generally having a relatively high carbon monoxide concentration, in contact with spent catalyst and partially regenerated catalyst in an intermediate section of the regenerator.

Because of the highly oxidizing atmosphere provided by a high free oxygen concentration and low carbon monoxide concentration in the regeneration gas in the lower section of the regeneration zone, combustion of nitrogen-containing compounds present in the coke burned in the lower section tends to form nitrogen oxides, especially in the presence of a carbon monoxide combustion-promoting metal. According to the invention, these nitrogen oxides are reacted to form free nitrogen (molecular nitrogen) in the intermediate section of the regeneration zone in the presence of the oxygen-free atmosphere provided by the absence of free oxygen. Therefore, regeneration gas leaving the intermediate section of the regeneration zone may typically contain a substantial amount of carbon monoxide, but is relatively free from nitrogen oxides. Simultaneously, catalyst particles reaching the bottom end of the regeneration zone are substantially coke-free.

Above the spent catalyst inlet level, additional free oxygen is added to the, oxygen-free, typically carbon monoxide-containing, regeneration gas. The additional free oxygen can suitably be added in any free oxygen-containing gas, such as pure oxygen, air, or the like. The amount of additional free oxygen introduced is preferably at least sufficient to react stoichiometrically with all the carbon monoxide present in the regeneration gas leaving the intermediate section of the regenerator to form carbon dioxide. Particularly preferable, enough additional free oxygen is introduced to provide at least 3 volume percent (excess) free oxygen in the regeneration gas in addition to the free oxygen required for stoichiometric combustion of all the carbon monoxide in the regeneration gas.

Combustion of carbon monoxide in the regeneration gas with added free oxygen releases a substantial amount of heat energy into the regeneration gas. It is highly desirable to recover this heat energy from the regeneration gas prior to its removal from the regenerator. The additional heat energy is often useful for carrying out a subsequent catalytic conversion operation (e.g., FCC conversion) using the coke-free, regenerated catalyst.

Typically, the regeneration gas has a low heat capacity, so that carbon monoxide combustion in the absence of catalyst could heat the flue gas to an extremely high temperature, with a consequent possibility of temperature damage to equipment contacted by the flue gas, such as cyclones, conduits, etc. In order to recover the heat evolved by carbon monoxide combustion and provide a heat sink, coke-free catalyst is supplied to the upper section, as by conducting a portion of the regenerated catalyst from the lower end of the regeneration zone into the upper section. Since the regenerated catalyst at the lower end of the regenerator is substantially coke-free, essentially no further heat or combustion products are added to the regeneration gas in the upper section and, in particular, no further nitrogen oxides are formed. Consequently, flue gas leaving the regeneration system is free from both nitrogen oxides and carbon monoxide.

Preferably, the substantially coke-free catalyst is passed into the upper section of the regeneration zone at a rate sufficient to maintain enough coke-free catalyst in the carbon monoxide burning region to absorb essentially all the heat released by carbon monoxide combustion. Particularly preferably, the heat sink provided by the coke-free catalyst is effective to restrict the maximum temperature of the regeneration gas in the upper section to less than 27° C. above the maximum temperature in the intermediate section of the regeneration zone. The height of the bed of essentially coke-free catalyst maintained in the upper section of the regeneration zone is sufficient to permit combustion of at least a major portion of the carbon monoxide in the regeneration gas in contact with the regenerated catalyst. Particularly preferably, the amount of regenerated catalyst introduced into the upper section of the regeneration zone and the height of the bed of regenerated catalyst maintained in the upper section, are sufficient to permit substantially complete combustion of all carbon monoxide in the regeneration gas, while the gas is in contact with the regenerated catalyst bed.

PREFERRED EMBODIMENT

The invention can best be further understood by referring to the specific, preferred embodiment shown in the attached drawing.

In carrying out a preferred embodiment of the invention, spent zeolite-type FCC catalyst containing a discrete alumina phase constituting at least 50 weight percent of the catalyst (zeolite-free basis) is regenerated. A combustion-promoting metal additive is employed in the system in the form of alumina particles containing 0.1 weight percent platinum. The additive particles are mixed with the catalyst particles in an amount sufficient to provide 1 part per million, by weight, of platinum in the mixture of catalyst and additive. The spent FCC catalyst to be regenerated typically contains about 0.3–2.0 weight percent coke, of which typically 0.01–1 weight percent is nitrogen and 0.25–5.0 weight percent is sulfur. It will be apparent to those skilled in the art that the amount of coke contained in typical spent FCC catalyst varies substantially above and below this concentration, depending on the specific feed and catalyst employed. The spent catalyst and combustion-promoting additive are introduced in the regeneration vessel 1 through the conduit 3 at the rate of 2,400 tons per hour. The spent catalyst entering the regeneration vessel mixes with fluidized previously regenerated catalyst moving generally downwardly from above the perforated plate 27. Air is introduced into the regeneration vessel through the distributor 9 at a rate sufficient to provide the desired amount of free oxygen. Steam is added as necessary to maintain the regeneration gas flow rate and superficial velocity at a proper level to fluidize the particles in the regeneration vessel. Backmixing of catalyst particles in the fluidized bed is restricted by the perforated plates 23, 25, 27 and 29, so that the catalyst particles tend to move downwardly through the regeneration zone in plug-type flow. Sufficient coke is burned off the catalyst particles before they reach the distribution grid 11 at the bottom end of the regeneration vessel so that catalyst at the lower end of the bed contains less than 0.1 weight percent coke. Coke-free, regenerated catalyst is withdrawn through the conduit 13. Part of the regenerated catalyst is passed through the conduit 19 and introduced into the upper section of the regenerator vessel 1 at the rate of 600 tons per hour. The remainder of the regenerated catalyst is withdrawn from the regeneration system through the conduit 21 for catalytic use at the rate 2,400 tons per hour. The amount of free oxygen contained in the regeneration gas introduced through the distributor 9 is restricted sufficiently so that the free oxygen content of the regeneration gas, as it passes through the perforated plate 27, is less than 0-1 volume percent. The carbon monoxide concentration is about 2 volume percent. The maximum temperature of the regeneration gas as it passes through the plate 27 is about 650° C. Additional free oxygen, in a gas such as air or mixed air and steam, is introduced into the regeneration gas stream, by means of the distributor 33, at a rate sufficient to provide free oxygen for essentially complete combustion of all the carbon monoxide in the first regeneration gas to form carbon dioxide and to provide a residual free oxygen concentration of at least 3 volume percent in flue gas removed from the regeneration vessel through the conduit 39. The temperature of the regeneration gas stream above the top of the regenerated catalyst bed (flue gas) in the upper section of the vessel as shown at the line 37 in the drawing is about 670° C. The flue gas stream leaving the regenerated catalyst bed and passing into cyclone 35 contains less than 0.1 volume percent carbon monoxide and less than 200 parts per million, by volume, of nitrogen oxides.

A preferred embodiment of the present invention having been described, various modifications and equivalents of the invention within the scope of the invention, as defined in the appended claims, will be apparent to those skilled in the art.

What is claimed is:

1. A method for removing nitrogen-containing coke from coke-containing particulate catalyst, which comprises:
   (a) introducing said coke-containing catalyst into an intermediate vertical level of a vertically extending regeneration zone, passing said catalyst downwardly through said zone, and restricting backmixing of catalyst in said zone;
   (b) introducing a regeneration gas comprising free oxygen into a lower end of said zone, passing said regeneration gas upwardly through said catalyst, burning substantially all said coke off said catalyst and substantially all carbon monoxide formed in a lower section of said regeneration zone, sufficient free oxygen being included in said regeneration gas to provide at least 1 volume percent free oxygen in contact with catalyst in said lower section, whereby nitrogen oxides are generated in said regeneration gas in said lower section;
   (c) forming carbon monoxide and carbon dioxide and generating a substantially oxygen-free atmosphere in contact with said catalyst in an intermediate section of said regeneration zone by substantially completely reacting free oxygen in said regeneration gas with coke and carbon monoxide in said intermediate section, and decreasing the amount of nitrogen oxides in said regeneration gas in said intermediate section by reacting at least a portion of said nitrogen oxides in said oxygen-free atmosphere to form free nitrogen;
   (d) introducing substantially coke-free catalyst into an upper section of said zone, and passing said coke-free catalyst downwardly through said zone;
   (e) burning substantially all carbon monoxide contained in said regeneration gas with additional free oxygen in contact with said substantially coke-free catalyst in said upper section, and withdrawing said regeneration gas from said upper section.

2. A method according to claim 1 wherein coke in said coke-containing catalyst includes a sulfur component, sulfur oxides are formed by burning said coke, and said sulfur oxides are reacted with a solid reactant included with said catalyst particles to form sulfur-containing solids in said zone.

3. A method according to claim 2 wherein said solid reactant comprises alumina.

4. A method according to claim 1 wherein substantially coke-free catalyst is passed from said lower end of said regeneration zone to said upper section.

5. A method according to claim 1 wherein sufficient additional free oxygen is added to said regeneration gas above said intermediate section to provide at least 3 volume percent free oxygen in regeneration gas removed from said upper section.

6. A method according to claim 1 wherein a metallic combustion promoter is introduced into said regeneration zone with said coke-containing catalyst.

7. A method according to claim 6 wherein said metallic combustion promoter is at least one metal or compound of a metal selected from platinum, palladium, iridium, osmium, rhodium, ruthenium, copper, chromium and manganese.

* * * * *